(12) United States Patent
Papakonstantopoulos et al.

(10) Patent No.: US 12,043,008 B2
(45) Date of Patent: Jul. 23, 2024

(54) METHOD FOR REPAIRING SELF-SEALING TIRES

(71) Applicant: THE GOODYEAR TIRE & RUBBER COMPANY, Akron, OH (US)

(72) Inventors: George Jim Papakonstantopoulos, Medina, OH (US); Michael Lawrence Gersman, Cleveland, OH (US); Andreas Frantzen, Trier (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 51 days.

(21) Appl. No.: 17/470,058

(22) Filed: Sep. 9, 2021

(65) Prior Publication Data

US 2022/0111609 A1 Apr. 14, 2022

Related U.S. Application Data

(60) Provisional application No. 63/090,941, filed on Oct. 13, 2020.

(51) Int. Cl.
*B29C 73/16* (2006.01)
*B29C 73/22* (2006.01)
(Continued)

(52) U.S. Cl.
CPC ............ *B29C 73/163* (2013.01); *B29C 73/22* (2013.01); *C08L 23/22* (2013.01); *B29D 2030/0698* (2013.01); *B29L 2030/00* (2013.01)

(58) Field of Classification Search
None
See application file for complete search history.

(56) References Cited

U.S. PATENT DOCUMENTS 1,307,173 A 6/1919 Anthony
1,419,470 A 6/1922 Reasoner et al.
(Continued)

FOREIGN PATENT DOCUMENTS

DE 102017211125 A1 * 1/2019
EP 1060870 A2 12/2000
(Continued)

OTHER PUBLICATIONS

ESpaceNet Translation of JP2002362118A (Year: 2023).*
(Continued)

*Primary Examiner* — Katelyn W Smith
*Assistant Examiner* — Alexander D Booth
(74) *Attorney, Agent, or Firm* — Alvin T. Rockhill

(57) ABSTRACT

This invention discloses a technique for replenishing the level of sealant in self-sealing tires at the time that a puncture in the tire is being repaired or when the tire is being recapped. This technique provides the tire with its original level of self-sealing capabilities and will enhance the possibility of the tire remaining in service until it can be conveniently repaired. This method involves (1) injecting a liquid sealant formulation into the sealant layer of a self-sealing tire through at least one puncture hole therein, and (2) sealing the hole or holes in the supporting carcass and the innerliner of the tire. The sealant utilized is typically liquid polyisobutylene having a weight average molecular weight of 25,000 to 200,000. The sealant formulation used can optionally also contain a colorant or a pigment.

15 Claims, 1 Drawing Sheet

(51) Int. Cl.
*B29D 30/06* (2006.01)
*B29L 30/00* (2006.01)
*C08L 23/22* (2006.01)

(56) References Cited

U.S. PATENT DOCUMENTS

| | | | |
|---|---|---|---|
| 1,601,013 | A | 9/1926 | Wildman |
| 1,977,281 | A | 10/1934 | Knowlton |
| 2,877,819 | A | 3/1959 | Gibbs |
| 3,048,509 | A | 8/1962 | Sweet et al. |
| 4,089,360 | A | 5/1978 | Bohm |
| 4,140,167 | A | 2/1979 | Bohm et al. |
| 4,216,812 | A * | 8/1980 | Bourne ............... B29C 73/163 156/115 |
| 4,228,839 | A | 10/1980 | Bohm et al. |
| 4,426,468 | A | 1/1984 | Orum et al. |
| 4,895,610 | A | 1/1990 | Egan |
| 4,913,209 | A | 4/1990 | Hong et al. |
| 5,085,942 | A | 2/1992 | Hong et al. |
| 5,295,525 | A | 3/1994 | Sanda, Jr. |
| 6,837,287 | B2 | 1/2005 | Smith, Sr. et al. |
| 8,221,849 | B2 | 7/2012 | Naito |
| 8,360,122 | B2 | 1/2013 | Wilson |
| 9,427,918 | B2 | 8/2016 | Son et al. |
| 9,677,025 | B2 | 6/2017 | Voge et al. |
| 9,802,446 | B2 | 10/2017 | Dahlke et al. |
| 10,730,255 | B2 | 8/2020 | Barjon et al. |
| 2003/0152790 | A1 * | 8/2003 | Halladay ............ C08G 18/6208 428/500 |
| 2004/0030009 | A1 * | 2/2004 | Gugumus ............ C08K 5/3475 524/86 |
| 2005/0205185 | A1 * | 9/2005 | Reiter ............... B60C 5/14 156/115 |
| 2006/0048877 | A1 * | 3/2006 | Fukutomi ........... B60C 19/12 152/504 |
| 2011/0226399 | A1 | 9/2011 | Majumdar |

FOREIGN PATENT DOCUMENTS

GB 439869 A 12/1935
JP 2002362118 A * 12/2002 ............ B29C 73/163

OTHER PUBLICATIONS

Willenbacher, Norbert & Lebedeva, Olga.Polyisobutene-Based Pressure-Sensitive Adhesives. Technology of Pressure-Sensitive Adhesives and Products. p. 4-2 to 4-3.10.1201/9781420059410-4. (Year: 2008).*
ESpaceNet Translation of DE102017211125 (Year: 2023).*
Rodgers, B., Waddell, W.H. and Klingensmith, W. 2004. Rubber Compounding. Encyclopedia of Polymer Science and Technology. (Year: 2004).*
Anonymous: buy POLYISOBUTYLENE in Blue HDPE Drum Industrial Grade from Zhejiang Shunda new materials Limited by Share Ltd.—ECHEMI. May 11, 2017.
Extended European Search Report dated Mar. 14, 2022 for European Patent Application No. 21200702.5-1017 which is the European counterpart of the subject patent application.

* cited by examiner

METHOD FOR REPAIRING SELF-SEALING TIRES

This application claims benefit of U.S. Provisional Patent Application Ser. No. 63/090,941, filed on Oct. 13, 2020. The teachings of U.S. Provisional Patent Application Ser. No. 63/090,941 are incorporated herein by reference in their entirety.

FIELD OF THE INVENTION

This invention relates to a technique and puncture sealant formulation for replenishing sealant that has escaped from self-sealing pneumatic tires.

BACKGROUND OF THE INVENTION

Puncture sealing tires are designed to retard or prevent the loss of air and consequential deflation of the tire after being punctured with a sharp object, such as a nail. The objective of such puncture sealing tires is to allow the tire to remain in use for a period which is sufficient the vehicle on which they are installed to be driven safely to a location where the tire can be conveniently repaired or replaced. After the tire has been punctured sealant within the self-sealing tire flows into the puncture thereby impeding the escape of the gas used to inflate the tire (typically air). The sealant used is generally a viscous polymeric material, such as a butyl rubber, which continues to flow out of the puncture until the puncture has been repaired, the tire becomes deflated, or the level of sealant is exhausted.

Pneumatic tires with puncture sealing capabilities have been described in the literature since at least the first part of the twentieth century (see U.S. Pat. Nos. 1,419,470, 1,601, 013, and 1,977,281). Such early self-sealing tires were of a relatively simple design that generally included an unvulcanized layer of rubber which would theoretically flow into the puncture and seal it so as to prevent air loss. However, in actual practice such self-sealing tires were not very effective and consequently were of limited value.

Over the years better puncture sealing tires have been developed which allow for the tire to provide longer service after being punctured. In many cases, this provides for the continued use of the tire until it can be driven to a more convenient location for it to be repaired or replaced. For instance, it would be highly desirable if the vehicle on which the tire is installed could be driven to a garage or a tire service center for repair rather than being required to change the tire on a busy road, under inclement weather conditions, or in a less than desirable neighborhood. In any case, more and more sophisticated tire constructions, sealant compositions and methods for manufacturing self-sealing tires have been developed. In most of these designs a sealant material is encased or encapsulated in between layers of the tire. For example, U.S. Pat. No. 2,877,819 discloses a unitary tubeless pneumatic tire, comprising a hollow casing of fabric reinforced vulcanized, rubber-like elastic material and including a circumferential tread portion of substantial width and opposite sidewalls extending radially inwardly therefrom, and an annular puncture-sealing body of substantial width on the inner periphery of said casing in laterally centered relation with respect to said tread portion and sidewalls, said body including radially inner and outer walls of rubber-like material integrally connected at laterally spaced peripheral side portions of the body and said outer wall being integrally connected at laterally spaced peripheral side portions of the body and said outer wall being integrally cured to the elastic material of said fabric reinforced casing, said body having web portions integrally connecting between said inner and outer walls thereof defining a plurality of separate calls completely around the body, and said cells containing puncture-sealing material, said web portions being uniformly relatively thin, whereby said cellular body between said inner and outer walls thereof is predominantly puncture sealing material so that a puncturing object penetrating the tread portion of said casing and said body at substantially any point must pass through sufficient said puncture sealing material to seal against escape of inflation air through the puncture made by the puncturing object.

U.S. Pat. No. 3,048,509 discloses a laminated puncture sealing strip for pneumatic tires comprising a plurality of superposed sealing sheets that are not more than about one-tenth inch or less than about one-twentieth inch in thickness and that are composed of a soft sticky unvulcanized synthetic rubber sealing composition comprising a copolymer of 1,3-butadiene and styrene which contains at least 50% by weight of the diene combined with 35 to 115 parts by weight of softening and tackifying agents per 100 parts of the copolymer and with from 35 to 65 parts by weight of a pigment per 100 parts of the copolymer, said softening and tackifying agents and pigments being so proportioned that said sealing composition has a plasticity of from 20 to 35 as measured on a Neodoptifa-Hoekstra plastometer, and means for restricting flow of the sealing composition and for protecting the same against deterioration comprising separating and covering sheets alternating with the sealing sheets, said separating and covering sheets being thinner than said sealing sheets and being composed mainly of a vulcanized rubber compound the principal rubbery component of which is selected from the group consisting of a polymer of chloroprene and styrene-butadiene rubbers than contain at least 50% by weight of the diene, said rubber compound being substantially free from sulfur and migratory curing agents.

U.S. Pat. No. 4,089,360 discloses a pneumatic tire having a laminate as an abrasion gum strip or an innerliner wherein said laminate is comprised of at least two groups of layers with each group having at least one layer and each layer of said laminate comprising a rubber compound having an unsaturated, amorphous polymer selected from the group consisting of natural rubber and synthetic rubber and each layer having sulfur and sulfur cure accelerators so that said layers will vulcanize when exposed to a subsequent vulcanization treatment, said laminate manufactured by the steps comprising providing at least one layer of a first group with a component selected from the group consisting of paradichlorobenzene and the thioetherpolythiols; providing at least one layer of a second group with components selected from the group consisting of 2,6-di-t-butyl-p-cresol; phenyl beta-naphthylamine; 4,4' thiobis (6-t-butyl-m-cresol); N-(1,3-dimethylbutyl) N' phenyl-p-phenylene diamine; syn-di-betanaphthyl-p-phenylene diamine; and aromatic oils; said components yielding different degrees of cross-linkage in said layers when said layers are subjected to irradiation; assembling at least one of said layers from each said group into contiguous relationship to form a laminate; subjecting said laminate to irradiation so that at least two of said layers are cross-linked to a different degree; assembling said laminate into said tire and vulcanizing said tire.

U.S. Pat. No. 4,140,167 discloses a pneumatic tire comprising as one of its rubber elements a laminate comprising at least five layers of rubber compounds produced by providing at least two outer layers with a desensitizing agent which retards cross-linkage when subjected to irradiation, providing two inner layers of said laminate with a sensitizing agent which promotes cross-linkage when subject to irradiation, providing a middle layer located between said sensitized layers with a material which degrades when exposed to irradiation, assembling said laminate with said middle layer located between the two sensitized layers and the one of said desensitized layers located outside of each of said sensitized layers, subjecting said laminate to irradiation so that said layers are differentially cross-linked with said sensitized layers being cross-linked to a greater degree than said desensitized layers and said middle layer being degraded to yield a soft product, assembling said laminate into said tire and vulcanizing said tire. The degraded polymeric material utilized in such tires can be polyisobutylene, copolymers containing polyisobutylene, or polyethylene oxide, and the cross-linked polymeric material can be natural rubber, copolymers of butadiene and styrene and halogenated butyl rubber.

U.S. Pat. No. 4,228,839 discloses a self-sealing pneumatic tire comprising an annular road-engaging tread surface, two sidewalls each connecting a side of said tread surface to an annular bead, reinforcing body plies extending from one bead to the other through the sidewalls and tread and a puncture-sealant layer located in the crown area of said tire radially inward of said reinforcing body plies, said puncture-sealant layer comprising a blend of a first polymeric material that degrades on exposure to irradiation and a second polymeric material that crosslinks on exposure to irradiation, vulcanization temperatures or both to form an elastic matrix for said first polymeric material, said tire manufactured by the steps comprising providing a layer comprised of blended rubber compound with said blend of said first and second polymeric materials, assembling said layer into an unvulcanized tire as its innermost layer in the crown area, vulcanizing said tire, and subsequently irradiating said tire to degrade said first polymeric material whereby said first polymeric material forms a tacky material in said second crosslinked polymeric material which acts as an elastic matrix for said first polymeric material, whereby said layer with said polymeric material combination has puncture sealing properties. In these tires, the first polymeric material can be polyisobutylene or a copolymer of polyisobutylene and the second polymeric material can be a halogenated butyl rubber, an ethylene propylene terpolymer, polybutadiene rubber, a copolymer of styrene and butadiene, a block copolymer, a butadiene acrylonitrile copolymer, natural rubber, polyisoprene, or neoprene.

U.S. Pat. No. 4,426,468 describes a self-sealing composition for a tire based on crosslinked butyl rubber having a very high molecular weight. U.S. Pat. No. 4,426,468 more specifically describes a butyl rubber based sealant composition, the butyl rubber constituent of which is present only in the form of a copolymer having a viscosity average molecular weight in excess of 100,000, comprising the reaction product of said butyl rubber, a curing system including a cross-linking agent selected from the group consisting of at least 2 parts by weight of a quinoid cross-linking agent per hundred parts butyl rubber and at least 5 parts by weight of a phenolic cross-linking agent per hundred parts butyl rubber, and at least one tackifier compatible with butyl rubber, and a filler material, the composition being compounded such that it has a tensile strength of at least 30 psi, an elongation of at least 600% and a cross-link density such that its swell ratio in toluene is between 12 and 40. However, butyl rubbers have the drawback of exhibiting a high level of hysteresis over a broad temperature range which increased the rolling resistance of tires and is detrimental of fuel economy.

As an alternative to butyl rubbers self-sealing compositions for tires can also be made using unsaturated diene elastomers, including natural rubber. Such compositions are described in U.S. Pat. Nos. 4,913,209, 5,085,942, and 5,295,525. These compositions are characterized by the combined presence of a high content of hydrocarbon resin as tackifier, always greater than 100 parts by weight per hundred parts. In addition, a large amount of liquid elastomer gives a high fluidity to the composition which is a source of other drawbacks, in particular a risk of the self-sealing composition flowing during use at relatively high temperature (typically above 60° C.) frequently encountered during the use of the tires in certain geographical regions.

U.S. Pat. No. 6,837,287 describes a method of manufacturing a pneumatic rubber tire having an outer circumferential tread, a supporting carcass therefore, and an inner liner disposed inwardly from said supporting carcass, containing a puncture sealant layer positioned between said inner liner and said carcass, the steps of which comprise, based upon parts by weight per 100 parts by weight uncured butyl rubber (phr): (A) providing a butyl rubber-based rubber composition comprised of: (1) 100 phr of uncured star branched butyl rubber, (2) about 1 to about 35 phr of a particulate precured rubber, selected from resin-cured butyl rubber and/or sulfur-cured diene-based rubber, homogeneously dispersed in said uncured butyl rubber, and (3) about 1 to about 16 phr of organoperoxide; (B) assembling said butyl rubber based rubber composition as a layer into an unvulcanized rubber tire between said carcass and said innerliner during the tire building process; and (C) shaping and curing said rubber tire at a temperature in a range of about 130° C. to about 170° C. for a sufficient period time to partially depolymerize said uncured butyl rubber in said butyl rubber-based rubber composition layer, wherein said particulate precured rubber substantially remains in its precured condition as a particulate dispersion within said partially depolymerized butyl rubber.

U.S. Pat. No. 8,221,849 discloses a method of producing a self-sealing pneumatic tire comprising the steps of: injecting a viscous sealant material onto an internal surface of a vulcanization molded pneumatic tire; rotating the pneumatic tire around a tire axis while forming the sealant material into a sealant layer diffused in a sheet form by centrifugal force, injecting a cover material comprising an unhardened rubber-based material or a resin-based material onto the internal surface of the sealant layer; rotating the pneumatic tire around the tire axis while forming the cover material into a cover sheet layer diffused in a sheet form by centrifugal force; and hardening the cover sheet layer by irradiating with an electron beam, infrared rays, ultraviolet rays, or ultrasonic waves.

U.S. Pat. No. 8,360,122 describes a tire sealant material composition comprising at least one non-halogenated butyl rubber, and 2,2'-dibenzamido-diphenyldisulfide, the sealant material composition having a viscosity that permits the sealant material composition to be incorporated into a tire during a tire building process and to degrade to a lower viscosity that permits the resulting degraded sealant material composition to flow into and seal a puncture in a tire.

U.S. Pat. No. 9,427,918 discloses a color sealant composition for a tire, comprising: 100 parts by weight of a raw rubber, 10 to 60 parts by weight of surface modified silica prepared by placing silica at 300° C. to 500° C. for 30 minutes to 3 hours, 0.05 to 5 parts by weight of pigment, to 100 parts by weight of polybutene having a number average molecular weight of 1,000 to 1,500, 60 to 300 parts by weight of polybutene having a number average molecular weight of 2,000 to 3,000, and 5 to 15 parts by weight of peroxide. The raw rubber in this tire sealant composition can be natural rubber, butyl rubber, or a blend of natural rubber and butyl rubber.

U.S. Pat. No. 9,677,025 describes an inflatable article comprising a puncture-resistant layer, said layer comprising an elastomer composition having a self-sealing property, wherein the composition comprises: a blend of at least two solid elastomers, a polybutadiene or butadiene copolymer elastomer, referred to as "elastomer A", and a natural rubber or synthetic polyisoprene elastomer, referred to as "elastomer B", the elastomer A:elastomer B ratio by weight being within a range from 10:90 to 90:10; between 30 phr and 90 phr of a hydrocarbon resin; and from 0 to less than 30 phr of filler.

U.S. Pat. No. 9,802,446 discloses a pneumatic vehicle tire comprising a tread, an inner layer, and a tire sealant disposed upon the inner layer and opposite the tread; wherein the tire sealant comprises expanded solids comprising expandable graphene structures and microspheres; wherein the expanded solids are incorporated into the tire sealant in an amount of from 1 weight percent to 20 weight percent and, wherein the tire sealant provides sealing by flowing into a defect site penetrating the tread and the inner layer.

U.S. Pat. No. 10,730,255 describes a method of applying a rubber-based self-sealing composition on an inner surface of a tire casing, comprising the steps of: introducing a non-crosslinked self-sealing composition into an inlet of an extrusion device; adjusting speed and temperature conditions of the extrusion device so that, at an application nozzle forming an outlet die of said extrusion device, the self-sealing composition is crosslinked, and bringing the application nozzle close to the inner surface of said casing previously set in relative motion with respect to the application nozzle, and depositing an extruded and crosslinked bead having a given width and profile directly on said internal surface of the casing; wherein the extrusion device includes an assembly comprising a screw rotated in a barrel, the extrusion device further including a duct positioning downstream of the assembly that opens into the application nozzle; wherein the extrusion device includes a plurality of zones, and the method further includes increasing the temperature of the composition in a first zone to a set point temperature between 140° C. and 220° C. during a first period of time, maintaining the temperature at the set point temperature in a second zone for a second period of time, and increasing the temperature in a third zone for a third period of time, wherein the third period of time is shorter relative to the second period of time; wherein the third zone includes the duct and the application nozzle.

Many additional methods, sealants and tire constructions have been suggested for puncture sealant pneumatic tires. However, all of these ideas have had certain drawbacks. For example, the use of fluid puncture sealant coatings which seal by flowing into the puncture hole are frequently unsuccessful primarily because sealant coatings may flow excessively and thus tend to cause the tire to become out of balance. In other cases the sealant coating is not operable or effective over a wide temperature range extending from hot summer to cold winter conditions. Central cores of cellular material which will physically maintain the shape of the tire when punctured can place a restriction on the maximum speed of a vehicle on which they are used because of potential breakdown or destruction of the cells caused by the effects of heat and distortion. More complicated structures wherein the sealant material is encased in a vulcanized material are usually expensive to manufacture and can also create balance and suspension problems due to the additional weight required in the tire.

Puncture sealing tires can be built wherein a layer of degraded rubber which is tacky or gummy (of low viscosity) is assembled into the unvulcanized tire. This method of construction is usually only reasonably possible when the degraded layer of rubber is laminated with another undegraded layer which permits its handling during the tire building procedure. This is because the tacky, sticky nature and lack of strength in degraded rubber make it very difficult to handle alone without additional support and a barrier to keep it from sticking to a tire building machine or curing apparatus. By laminating the degraded rubber layer between two or more undegraded rubber layers it is capable of retaining its structural integrity during the tire building and vulcanization process wherein high pressures are applied to the tire which would displace the degraded rubber layer from its desired location if not laminated. Such a lamination procedure adds greatly to the cost of building a tire. Thus, such lamination procedures have not been widely accepted on a commercial basis for building puncture sealing pneumatic tires.

The most common commercial approach used in manufacturing self-sealing tires is to build a layer of degradable material which can be easily handled into the tire. This layer of degradable material is sandwiched between other layers of the tire. In many cases it will be positioned between two layers of innerliner or between the innerliner and the supporting carcass of the tire. In any case, this degradable material breaks down at the elevated temperatures which are employed during the vulcanization of the tire into a low viscosity, tacky material. This approach greatly facilitates the tire building procedure by eliminating the need to handle such a sticky material when the tire is being built.

After a self-sealing tire is punctured sealant usually escapes through the puncture in the tire. This results in the level of sealant in the tire being diminished or becoming totally exhausted before the tire is repaired or replaced. In repairing such self-sealing tires the hole in the tire is normally simply plugged using conventional well known techniques. However, if doing tire repairs using conventional techniques the quantity of sealant in the tire is not typically replenished. Accordingly, the tire may subsequently contain an insufficient quantity of sealant to provide the tire with adequate self-sealing capabilities.

SUMMARY OF THE INVENTION

This invention discloses a technique for replenishing the level of sealant in self-sealing tires at the time that a puncture or punctures in the tire are being repaired or when the tire is being recapped. This technique can be used to provide the tire with its original level of self-sealing capabilities and will enhance the possibility of the tire remaining in service until the vehicle on which it is installed can be driven safely to a location where the tire can be conveniently repaired or replaced.

This invention more specifically discloses a method for replenishing sealant that has escaped from a self-sealing pneumatic tire through one or more holes, wherein said self-sealing pneumatic tire is comprised of a generally toroidal-shaped supporting carcass with an outer circumferential tread, two spaced beads, at least one ply extending from bead to bead, sidewalls extending radially from and connecting said tread to said beads, a sealant layer which is disposed inwardly from the supporting carcass, and an innerliner which is disposed inwardly from the sealant layer, and wherein said circumferential tread is adapted to be ground-contacting, said method comprising (1) injecting a liquid sealant formulation into the sealant layer of the tire through at least one of the holes, and (2) repairing the hole or holes in the supporting carcass and the innerliner of the tire. The sealant used in the practice of this invention is typically liquid polyisobutylene which can optionally further contain a colorant or a pigment, such as a red, orange, yellow, green, or blue pigment or colorant.

The subject invention further reveals a sealant composition which is particularly useful for repairing self-sealing tires, said sealant composition consisting essentially of a liquid polyisobutylene having a weight average molecular weight which is within the range of 25,000 to 200,000 and a colorant or a pigment.

The present invention also discloses a method for replenishing sealant that has escaped from a self-sealing pneumatic tire through one or more holes, wherein said self-sealing pneumatic tire is comprised of a generally toroidal-shaped supporting carcass with an outer circumferential tread, two spaced beads, at least one ply extending from bead to bead, sidewalls extending radially from and connecting said tread to said beads, a sealant layer which is disposed inwardly from the supporting carcass, and an innerliner which is disposed inwardly from the sealant layer, and wherein said circumferential tread is adapted to be ground-contacting, said method comprising (1) making a slit in the innerliner of the tire, (2) inserting a sealant composition into the slip to replenish the level of sealant in the tire, wherein the sealant composition is comprised of a butyl rubber and/or polyisobutylene and a peroxide, (3) repairing the slit and any the hole or holes in the supporting carcass of the tire, such as by patching or plugging the slit or hole(s), (4) subjecting the tire to a cure cycle. In this embodiment of the invention it is convenient for the cure cycle to be the heat treatment step used in curing a replacement tread onto a tire as it is being recapped.

BRIEF DESCRIPTION OF THE DRAWINGS

The present invention is further illustrated by the accompanying drawings. These drawings represent two preferred embodiments of the present invention.

DETAILED DESCRIPTION OF THE INVENTION

Sealant which is lost from conventional self-sealing tires which are manufactured utilizing conventional tire building techniques can be replenished utilizing the technique of this invention. The replacement sealant will be injected into the sealant layer of the tire in an amount which is sufficient to replace the quantity of sealant lost. This is typically a level which will expand the sealant layer to its original size. For instance, the replacement sealant is normally injected in a quantity which will restore the sealant layer of the tire to its original thickness. Generally, the thickness of the sealant layer will range from about 0.2 mm to about 8.5 mm. It is generally preferred for the sealant layer to have a thickness of 3 mm to 6 mm and is typically most preferred for the sealant layer to have a thickness which is within the range of 4 mm to 5 mm. In passenger tires it is normally most preferred for the sealant layer to have a thickness of about 4.5 mm.

Figure 1:
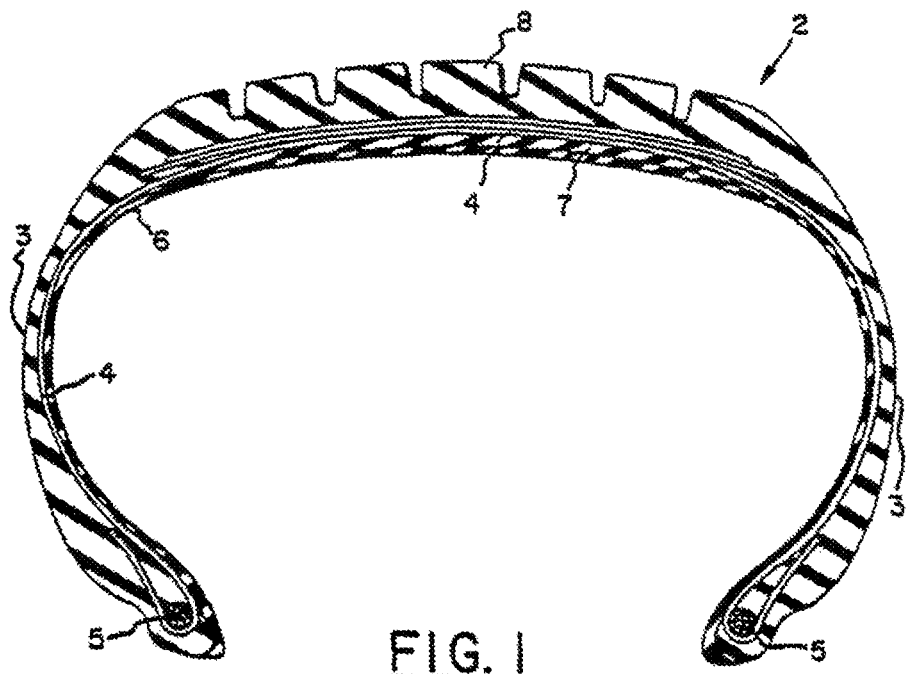
FIG. 1 is a cross-sectional view of a tire of this invention wherein the sealant layer is sandwiched between the innerliner and carcass of the tire.
Figure 2:
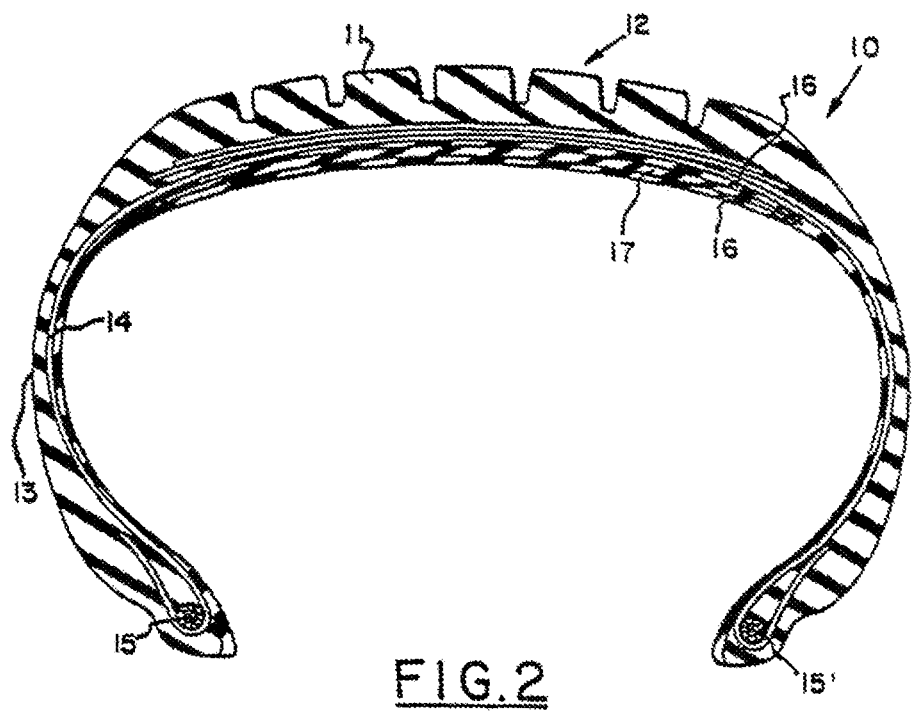
FIG. 2 is a cross-sectional view of a pneumatic rubber tire of this invention wherein the self-sealant layer of the tire is located between two layers of innerliner in the tire.

The sealant layer will normally extend from one shoulder of the tire to the other, in other words, it should cover the crown area of the tire. In most cases the sealant layer is situated in the tire between the supporting carcass and the innerliner of the tire as is illustrated in FIG. 1. The innerliner is an air barrier layer that serves to keep air or another gas, such as nitrogen, which is used to inflate the tire for escaping through the tire structure by diffusion. The innerliner is typically comprised of a halobutyl rubber or some other suitable material having a high degree of resistance to gas permeation. Another possibility is for the sealant layer to be situated in the tire between two layers of innerliner as is illustrated in FIG. 2. In other words, it is sandwiched between two or more layers of innerliner or between one or more innerliner layers and the tire carcass.

The self-sealing tire 2 depicted in FIG. 1 has sidewalls 3, a supporting carcass 4, inextensible beads 5, an innerliner (air barrier layer) 6, a sealant layer 7, and an outer circumferential tread (tread portion) 8. The individual sidewalls 3 extend radially inward from the axial outer edges of the tread portion 8 to join the respective inextensible beads 5. The supporting carcass 4 acts as a supporting structure for the tread portion 8 and sidewalls 3. The sealant layer 7 is disposed inwardly from said supporting carcass 4 and outwardly from said innerliner 6. The outer circumferential tread 8 is adapted to be ground contacting when the tire is in use. In this embodiment of the invention, the innerliner 6 is disposed inwardly from said supporting carcass 4.

In FIG. 2 a self-sealant pneumatic rubber tire 10 of another embodiment of this invention is depicted. This pneumatic tire of the tubeless type includes a tread portion 11, a crown area 12, sidewalls 13, a supporting carcass 14, inextensible beads 15, an innerliner 16, and sealant layer 17. In this embodiment of the present invention the sealant layer 17 is sandwiched between two layers of innerliner 16. This, sealant layer 17 is disposed inwardly from one layer of innerliner and outwardly from another layer of innerliner. Both layers of innerliner 16 and the sealant layer 17 are disposed inwardly from the supporting carcass 14.

In the practice of this invention the replacement sealant is injected into the depleted sealant layer of the tire. The replacement sealant is normally injected into the depleted sealant layer through a hole where the tire was previously punctured. This is normally done using a dull pointed injector. In cases where the tire was not punctured, but the level of sealant needs to be supplemented, such as in retreading operations, the replacement sealant can be injected into the sealant layer by piercing through the innerliner using an injection needle having a sharp point. In either case, after the replacement sealant has been injected any holes in through the innerliner and/or supporting carcass are repaired so as to plug the holes.

The replacement sealant employed in the practice of this invention is typically liquid polyisobutylene. The polyisobutylene typically has a weight average molecular weight which is within the range of 25,000 to 200,000. The polyisobutylene more typically has a weight average molecular weight which is within the range of 30,000 to 160,000, and preferably has a weight average molecular weight which is within the range of 40,000 to 130,000. The polyisobutylene more preferably has a weight average molecular weight which is within the range of 50,000 to 110,000. In many cases the polyisobutylene rubber will have a weight average molecular weight which is within the range of 50,000 to 75,000. The polyisobutylene can be used neat without any additional ingredients being included in the sealant formulation.

The replacement sealant can optionally also include a pigment or a colorant to make the point where a tire was punctured more visible. A wide variety of colors can be used for this purpose with light colors which stand out from the characteristic black color of tire treads being preferred. Titanium dioxide can be utilized to impart a brilliant white color, red iron pigment can be used to impart a brilliant red color, or pigment yellow 12 can be used to impart a brilliant yellow color. The pigment or colorant will typically be utilized in a quantity that will make punctures in the tire more readily apparent and will normally be used at a level which is within the range about 1 phr to about 5 phr, and will preferably be used at a level which is within the range of 2 phr to 4 phr.

Both organic and inorganic pigments can be utilized. In most cases the pigment or colorant will be of a white, red, orange, yellow, green, or blue color. Some representative examples of pigments that can be utilized include, but are not limited to, Pigment Yellow 1 (CAS No. 2512-29-0), Pigment Yellow 110 (CAS No. 5590-18-1), Pigment Yellow 12 (CAS No. 15541-56-7), Pigment Yellow 126 (CAS No. 90268-23-8), Pigment Yellow 127 (CAS No. 68610-86-6), Pigment Yellow 13 (CAS No. 5102-83-0), Pigment Yellow 138 (CAS No. 30125-47-4), Pigment Yellow 14 (CAS No. 5468-75-7), Pigment Yellow 150 (CAS No. 68511-62-6), Pigment Yellow 151 (CAS No. 31837-42-0), Pigment Yellow 154 (CAS No. 68134-22-5), Pigment Yellow 168 (CAS No. 71832-85-4), Pigment Yellow 17 (CAS No. 4531-49-1), Pigment Yellow 174 (CAS No. 78952-72-4), Pigment Yellow 180 (CAS No. 77804-81-0), Pigment Yellow 183 (CAS No. 65212-77-3), Pigment Yellow 191 (CAS No. 129423-54-7), Pigment Yellow 3 (CAS No. 6486-23-3), Pigment Yellow 34 (CAS No. 1344-37-2), Pigment Yellow 42 (CAS No. 51274-00-1), Pigment Yellow 65 (CAS No. 6528-34-3), Pigment Yellow 74 (CAS No. 6358-31-2), Pigment Yellow 75 (CAS No. 52320-66-8), Pigment Yellow 81 (CAS No. 22094-93-5), Pigment Yellow 83 (CAS No. 5567-15-7), C.I. Pigment Yellow 42 (iron oxide), C.I. Pigment Yellow 34 (lead chromates), C.I. Pigment Yellow 184 (bismuth vanadates), C.I. Pigment Yellow 53 (nickel antimony), C.I. Pigment Orange 20 (cadmium sulfide), C.I. Pigment Red 101 (iron oxide), C.I. Pigment Red 104, C.I. Pigment Red 29 (ultramarine pigment), C.I. Pigment Blue 29 (ultramarine pigment), C.I. Pigment Blue 28, C.I. Pigment Blue 36, C.I. Pigment Violet 15 (ultramarine pigment), C.I. Pigment Violet 16 (manganese violet), Pigment Green 17 (chrome oxide green), C.I. Pigment Green 19 (cobalt-based mixed metal oxides), C.I. Pigment Green 26 (cobalt-based mixed metal oxides), and C.I. Pigment Green 50 (cobalt-based mixed metal oxides).

Some additional inorganic pigments that can be used include Ultramarine blue, Persian blue, Cobalt blue (CAS No. 1345-16-0), Curlean blue, Egyptian blue, Han blue ($BaCuSi_4O_{10}$), Azurite blue ($Cu_3(CO_3)_2(OH)_2$), Prussian blue (CAS No. 14038-43-8), YInMn blue (Oregon blue), Realgar red ($\alpha$-$As_4S_4$), cadmium red ($Cd_2SSe$), Cerium sulfide red, Venetian red ($Fe_2O_3$), Red Ochre (anhydrous $Fe_2O_3$), Burnt sienna red, Red lead ($Pb_3O_4$), Vermilian red, Cinnabar red, Ultramarine violet, Han purple ($BaCuSi_2O_6$), Cobalt violet ($CO_3(PO_4)_2$), Manganese violet ($NH_4MnP_2O_7$), Purple of Cassius, Primrose yellow ($BiVO_4$), Cadmium yellow (CdS), Chrome yellow ($PbCrO_4$), Aureolin yellow ($K_3Co(NO_2)_6$), Yellow Ochre ($Fe_2O_3 \cdot H_2O$), Naples yellow, Titanium yellow ($NiO \cdot Sb_2O_3 \cdot 20TiO_2$), Zinc yellow ($ZnCrO_4$), and Chrome orange ($PbCrO_4$—PbO).

The replacement sealant will normally be void of fillers, such as carbon black, graphite, graphene, carbon nanotubes, wollastonite, silica, crystalline silica, clay, chemically modified clays, 2:1 layered silicate clays (montmorillonite, bentonite, hectorite, saponite, nontronite, beidellite, fluorohectorite, stevensite, volkonskoite, sauconite laponite, related analogs thereof and their physical blends), talc, diatomaceous earth, calcium carbonate ($CaCO_3$), calcium silicate, starch, lignin, alumina, and polyolefins, such as polypropylene. The replacement sealant will also normally be void of polyethylene glycol and oils, such as aromatic oils, paraffinic oils, naphthenic oils, triglyceride oils, and low PCA oils, such as MES, TDAE, SRAE and heavy naphthenic oils.

The following examples are included to further illustrate the method of replenishing the level of sealant in self-sealing tires. These examples are intended to be representative of the present invention and are not to be regarded as limiting the scope of the invention or the manner in which it can be practiced. Unless specifically indicated otherwise, parts and percentages are given by weight.

Examples 1-5 and Comparative Example 6

In this series of experiments a number of compositions were evaluated for use in replenishing the level of sealant in self-sealing tires which are being repaired or recapped. The results of these evaluations are reported in Table 1. It should be noted that Comparative Example 6 was a control in which a commercial butyl rubber sealant was evaluated. The storage modulus (G') values shown in Table 1 are reported in MPa.

TABLE 1

| Example | 1 | 2 | 3 | 4 | 5 | 6 |
|---|---|---|---|---|---|---|
|  | PIB | PIB | PIB | PIB[1] | PIB[2] | BR |
| $M_v$ | 40,000 | 55,000 | 85,000 | 85,000 | 85,000 | — |
| $M_w$ | 53,000 | 70,000 | 108,000 | 108,000 | 108,000 | — |
| G' @ 1% | 0.021 | 0.050 | 0.098 | 0.084 | 0.011 | 0.106 |
| G' @ 3% | 0.022 | 0.054 | 0.101 | 0.087 | 0.019 | 0.078 |
| G' @ 5% | 0.022 | 0.054 | 0.099 | 0.087 | 0.019 | 0.066 |
| tanδ @ 1% | 1.218 | 0.738 | 0.461 | 0.512 | 1.049 | 0.795 |
| tanδ @ 3% | 1.475 | 0.849 | 0.526 | 0.585 | 0.89 | 0.991 |
| tanδ @ 5% | 1.427 | 0.875 | 0.535 | 0.602 | 0.957 | 1.084 |

[1]The polyisobutylene rubber evaluated in this example also include 1.5 phr of Di-Cup 40C dicumyl peroxide on precipitated calcium carbonate (40.5% active) from Arkema Inc. and was cured.
[2]The polyisobutylene rubber evaluated in this example also include 3 phr of Di-Cup 40C dicumyl peroxide on precipitated calcium carbonate (40.5% active) from Arkema Inc. and was cured.

As can been seen from Table 1, the storage modulus values reported in Example 1 and Example 2 are less than 0.70 MPa and have characteristics that are useful for sealant compositions. In fact, these liquid polyisobutylene polymers have storage modulus values which are within an excellent range of 0.020 MPa to 0.055 MPa. As can be seen, the higher molecular weight polyisobutylene evaluated in Examples 3-5 could be reduced significantly by including a peroxide and subjecting it to a cure cycle. In any case, Table 1 shows that liquid polyisobutylene can be used to replenish the level of sealant in self-sealing tires.

In another embodiment of this invention, higher molecular weight semi-solid or even solid rubbers containing a peroxide can be used to replenish the level of sealant in self-sealing pneumatic tires. In other words, conventional sealant compositions as known in the art can be used in replenishing the level of sealant in self-sealing tires. In one scenario, a slit could be made in the innerliner of the tire with the semi-solid or solid sealant composition being inserted therein. Then, the slit in the innerliner is repaired and the tire is subjected to a cure cycle, such as curing the tread onto a tire in standard recapping techniques. Solid sealant compositions that can be employed in such procedures typically contain a butyl rubber and/or polyisobutylene, a peroxide, a filler, optionally, a processing oil, optionally, a colorant or pigment, and optionally polyethylene glycol. Such solid sealant compositions are described in greater detail in U.S. Patent Application Ser. No. 63/084, 898; U.S. Pat. Nos. 4,895,610; and 4,228,839. The teachings of U.S. Patent Application Ser. No. 63/084,898, U.S. Pat. Nos. 4,895,610, and 4,228,839 are incorporated herein by reference for the purpose of describing such solid sealant compositions.

Variations in the present invention are possible in light of the description of it provided herein. The illustrations and corresponding descriptions are not intended to restrict or limit the scope of the appended claims in any way. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method for replenishing sealant that has escaped from a self-sealing pneumatic tubeless tire through one or more holes, wherein said self-sealing pneumatic tire is comprised of a generally toroidal-shaped supporting carcass with an outer circumferential tread, two spaced beads, at least one ply extending from bead to bead, sidewalls extending radially from and connecting said tread to said beads, a sealant layer which is disposed inwardly from the supporting carcass, and an innerliner which is disposed inwardly from the sealant layer, and wherein said circumferential tread is adapted to be ground-contacting, said method comprising (1) injecting a liquid sealant formulation into the sealant layer of the tire through at least one of the holes, wherein the liquid sealant formulation is a polyisobutylene, wherein the liquid sealant formulation is void of fillers, wherein the liquid sealant formulation is void of peroxides, and wherein the liquid sealant formulation is injected into the sealant layer in an amount which is sufficient to replace the quantity of sealant that has escaped, and (2) repairing the hole or holes in the supporting carcass and the innerliner of the tire, wherein the hold or holes are repaired after the liquid sealant has been injected into the sealant layer.

2. The method as specified in claim 1 wherein the polyisobutylene has a weight average molecular weight which is within the range of 40,000 to 130,000.

3. The method as specified in claim 1 wherein the polyisobutylene has a weight average molecular weight which is within the range of 50,000 to 110,000.

4. The method as specified in claim 1 wherein the liquid sealant composition is further comprised of a pigment selected from the group consisting of red pigments, orange pigments, yellow pigments, green pigments, and blue pigments or a colorant selected from the group consisting of red colorants, orange colorants, yellow colorants, green colorants, and blue colorants.

5. The method as specified in claim 1 wherein said sealant composition is void of oils.

6. The method as specified in claim 1 wherein said sealant composition is void of polyethylene glycol.

7. The method as specified in claim 1 wherein said sealant composition is void of polydiene rubbers.

8. The method as specified in claim 1 wherein said sealant composition is void of natural rubber, synthetic polyisoprene rubber, emulsion styrene-butadiene rubber, solution styrene-butadiene rubber, isoprene-butadiene rubber, styrene-isoprene-butadiene rubber, styrene/butadiene diblock polymers, styrene/butadiene/styrene triblock polymers, neoprene, nitrile rubber, ethylene-propylene rubbers, and ethylene-propylene-diene monomer rubbers.

9. The method as specified in claim 1, wherein the sealant layer is sandwiched between two or more layers of innerliner.

10. The method as specified in claim 1 wherein the liquid sealant formulation is injected into the sealant layer in an amount which is sufficient to restore the sealant layer of the tire to its original thickness which is within the range of 0.2 to 8.5 mm.

11. The method as specified in claim 10 wherein the sealant layer is restored to its original thickness which is within the range of 3 mm to 6 mm.

12. The method as specified in claim 1 wherein the liquid sealant formulation is further comprised of a pigment or colorant is selected from the group consisting of Pigment Yellow 1 (CAS No. 2512-29-0), Pigment Yellow 110 (CAS No. 5590-18-1), Pigment Yellow 12 (CAS No. 15541-56-7), Pigment Yellow 126 (CAS No. 90268-23-8), Pigment Yellow 127 (CAS No. 68610-86-6), Pigment Yellow 13 (CAS No. 5102-83-0), Pigment Yellow 138 (CAS No. 30125-47-4), Pigment Yellow 14 (CAS No. 5468-75-7), Pigment Yellow 150 (CAS No. 68511-62-6), Pigment Yellow 151 (CAS No. 31837-42-0), Pigment Yellow 154 (CAS No. 68134-22-5), Pigment Yellow 168 (CAS No. 71832-85-4), Pigment Yellow 17 (CAS No. 4531-49-1), Pigment Yellow 174 (CAS No. 78952-72-4), Pigment Yellow 180 (CAS No. 77804-81-0), Pigment Yellow 183 (CAS No. 65212-77-3), Pigment Yellow 191 (CAS No. 129423-54-7), Pigment Yellow 3 (CAS No. 6486-23-3), Pigment Yellow 34 (CAS No. 1344-37-2), Pigment Yellow 42 (CAS No. 51274-00-1), Pigment Yellow 65 (CAS No. 6528-34-3), Pigment Yellow 74 (CAS No. 6358-31-2), Pigment Yellow 75 (CAS No. 52320-66-8), Pigment Yellow 81 (CAS No. 22094-93-5), Pigment Yellow 83 (CAS No. 5567-15-7), C.I. Pigment Yellow 42 (iron oxide), C.I. Pigment Yellow 34 (lead chromates), C.I. Pigment Yellow 184 (bismuth vanadates), C.I. Pigment Yellow 53 (nickel antimony), C.I. Pigment Orange 20 (cadmium sulfide), C.I. Pigment Red 101 (iron oxide), C.I. Pigment Red 104, C.I. Pigment Red 29 (ultramarine pigment), C.I. Pigment Blue 29 (ultramarine pigment), C.I. Pigment Blue 28, C.I. Pigment Blue 36, C.I. Pigment Violet 15 (ultramarine pigment), C.I. Pigment Violet 16 (manganese violet), Pigment Green 17 (chrome oxide green), C.I. Pigment Green 19 (cobalt-based mixed metal oxides), C.I. Pigment Green 26 (cobalt-based mixed metal oxides), and C.I. Pigment Green 50 (cobalt-based mixed metal oxides).

13. The method as specified in claim 1 wherein the liquid sealant formulation is further comprised of an inorganic pigment selected from the group consisting of Ultramarine blue, Persian blue, Cobalt blue (CAS No. 1345-16-0), Curlean blue, Egyptian blue, Han blue ($BaCuSi_4O_{10}$), Azurite blue ($Cu_3(CO_3)_2(OH)_2$), Prussian blue (CAS No. 14038-43-8), YInMn blue (Oregon blue), Realgar red ($\alpha$-$As_4S_4$), cadmium red ($Cd_2SSe$), Cerium sulfide red, Venetian red ($Fe_2O_3$), Red Ochre (anhydrous $Fe_2O_3$), Burnt sienna red, Red lead ($Pb_3O_4$), Vermilian red, Cinnabar red, Ultramarine violet, Han purple ($BaCuSi_2O_6$), Cobalt violet ($CO_3(PO_4)_2$), Manganese violet ($NH_4MnP_{2O7}$), Purple of Cassius, Primrose yellow ($BiVO_4$), Cadmium yellow (CdS), Chrome yellow ($PbCrO_4$), Aureolin yellow ($K_3Co(NO_2)_6$), Yellow Ochre ($Fe_2O_3 \cdot H_2O$), Naples yellow, Titanium yellow ($NiO \cdot Sb_2O_3 \cdot 20TiO_2$), Zinc yellow ($ZnCrO_4$), and Chrome orange ($PbCrO_4 \cdot PbO$).

14. A method for replenishing sealant that has escaped from a self-sealing pneumatic tubeless tire through one or more holes, wherein said self-sealing pneumatic tire is comprised of a generally toroidal-shaped supporting carcass with an outer circumferential tread, two spaced beads, at least one ply extending from bead to bead, sidewalls extending radially from and connecting said tread to said beads, a sealant layer which is disposed inwardly from the supporting carcass, and an innerliner which is disposed inwardly from the sealant layer, and wherein said circumferential tread is adapted to be ground-contacting, said method comprising (1) injecting a liquid sealant formulation into the sealant layer of the tire through at least one of the holes, wherein the liquid sealant formulation consists of a polyisobutylene, and wherein the liquid sealant formulation is injected into the sealant layer in an amount which is sufficient to replace the quantity of sealant that has escaped, and (2) repairing the hole or holes in the supporting carcass and the innerliner of the tire, wherein the hold or holes are repaired after the liquid sealant has been injected into the sealant layer.

15. The method as specified in claim 1 wherein the polyisobutylene has a storage modulus which is within the range of 0.020 MPa to 0.055 MPa.

* * * * *